Jan. 22, 1963     KIYOSHI MASE ET AL     3,074,107
APPARATUS FOR MANUFACTURING SELF-SUPPORTING CABLES
Filed Sept. 21, 1959
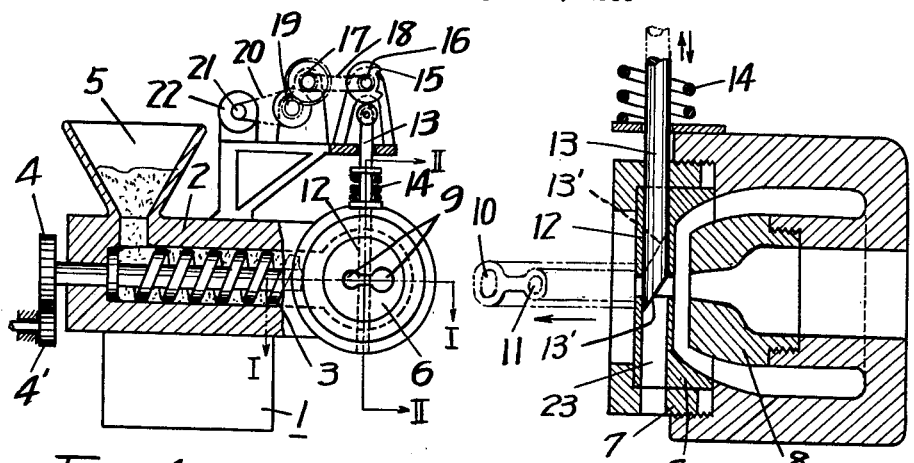
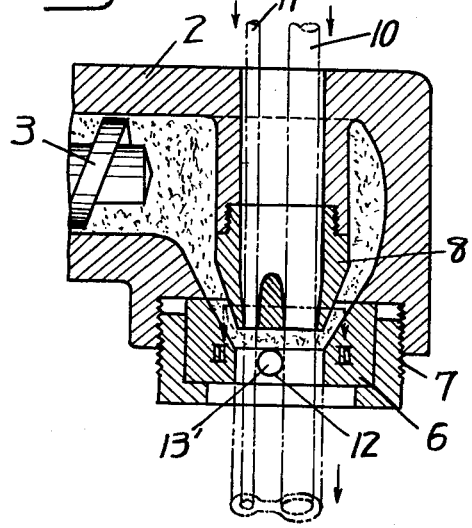
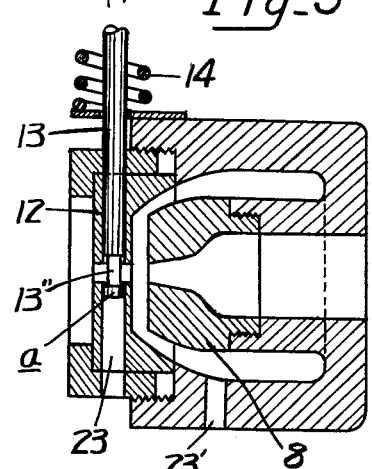
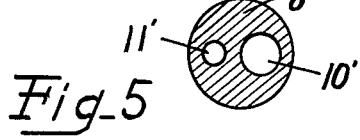
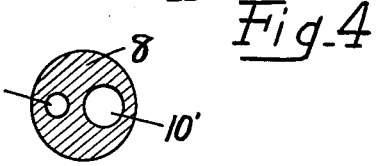
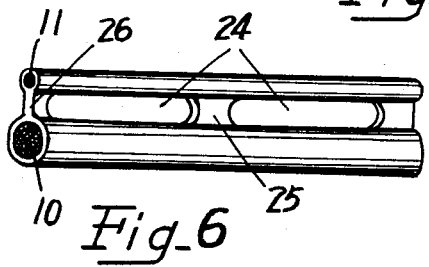
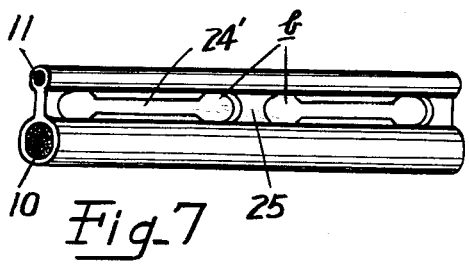

United States Patent Office 3,074,107
Patented Jan. 22, 1963

3,074,107
APPARATUS FOR MANUFACTURING SELF-SUPPORTING CABLES
Kiyoshi Mase, Sueo Ouchi, Masanobu Azuma, and Takashi Yagi, Hitachi City, Japan, assignors to Hitachi Wire and Cable, Limited, Tokyo, Japan
Filed Sept. 21, 1959, Ser. No. 841,089
Claims priority, application Japan Sept. 24, 1958
3 Claims. (Cl. 18—13)

This invention relates to an improvement in an apparatus for manufacturing self-supporting cables, more particularly to electrical communication and electrical power transmission cables having a supporting cable and window openings.

The principal object of this invention relates to apparatus for producing in simple and effective manner the self-supporting cable with window openings which can reduce wind resistance.

A self-supporting aerial cable which consists of a main cable and a supporting cable extending in parallel at a definite distance and united together by means of a same continuous protective covering, and which has dumb-bell like cross-section has advantages that it is easy in handling and maintenance. On the other hand, as it has broader width it is subjected to a greater resistance to wind pressure acting thereon so that the aerial cable vibrates to a large extent in case of strong wind. In order to obviate the above disadvantages, it has been proposed to provide window openings or longitudinal slots between two cables through the web of protective covering to minimize the wind resistance.

The present invention relates to an apparatus for manufacturing the self-supporting cable provided with such window openings, and is characterized in that provision is made of a check valve consisting of a slidable rod in the neck part of a die having a dumb-bell shaped opening and normally thereto of the covering material extrusion device and the valve is operated to open or close its port intermittently, thereby making longitudinal slots in the middle of covering material of two parallel cables at predetermined intervals.

For a better understanding of this invention reference is had to the accompanying drawing, of which:

FIG. 1 is an elevation in partial section of a device for carrying out the method of this invention;

FIG. 2 is a partial sectional plan view taken on the line I—I of FIG. 1 in an enlarged scale;

FIG. 3 is an enlarged sectional view taken on the line II—II of FIG. 1;

FIG. 4 is a similar view to FIG. 3 showing a modification of the valve;

FIG. 5 is a sectional view taken on the line III—III of FIG. 2;

FIG. 6 is a perspective view of the self-supporting cable made by the method of this invention; and FIG. 7 is a similar view to FIG. 6 showing a modified form of the longitudinal slot.

Referring to FIGS. 1 to 4, 1 designates an extruder having a cylinder 2 within which a helicoidal shaft 3 is arranged to be driven by gear wheels 4 and 4' from a power source such as an electric motor (not shown). 5 represents a hopper for the supply of a compound such as synthetic resins or synthetic rubbers. 6 is a metal die rigidly secured to the extruder by means of a threaded cap 7, and 8 is a guide piece. The die 6 has a dumb-bell shaped hole 9 for passing a main cable 10 and a cable 11 therethrough in parallel and at a definite speed, and the cooperating guide die 8 has two independent holes 10' and 11' as shown in FIG. 5 for passing the main cable 10 and cable 11 respectively.

According to this invention the die 6 is provided with a hole 12 at an intermediate position of the holes 9 in a direction normal to the longitudinal direction of the cables and a valve 13 consisting of a rod is fitted in the hole 12. The valve rod 13 is provided with a spring 14 to maintain it normally in an inoperative position and is arranged to be operated by a cam 15 acting on the end of valve rod 13. The cam 15 is driven by means of a suitable means such as sprocket wheels 16, 17 and chain 18 and through gearing 19 and rope and pulley transmission 20 and 21 from a motor 22 at a required speed. 23 represents an overflow or relief hole which may be formed in the same longitudinal hole as 12. But in case of FIG. 4 a suitable overflow hole 23' is also provided in the cylinder head.

The front end of valve rod 13 is cut diagonally as shown in FIG. 3 to form cutting edge 13', while in the case of valve rod 13 as shown in FIG. 4 its forward end is provided with a small diameter portion 13" leaving the top head of the same diameter for the purpose hereinafter explained.

In producing the self-supporting cable, the method of this invention using the device as shown in FIGS. 1, 2 and 3 at first to make the cable as shown in FIG. 6 will be explained. When the valve 13 is in inoperative position, that is, the raised position in FIGS. 1 and 3 and when the tip 13' is in the broken line position in FIG. 3 the compound put in hopper 5 and forced forward by the revolution of the shaft 3 makes covering 26 around the cable 10 and the cable 11 which are pulled through the openings 10' and 11' of the guide piece 8 and holes 9 of the die 6 in parallel at a predetermined speed so that totally covered self-supporting cable is produced. But when the valve rod 13 is moved by the rotation of cam 15 forward in the valve hole 12 to close the valve opening by the cut edge 13' at the top then the flow of the covering material is interrupted so that the longitudinal slots 24 as shown in FIG. 6 can be formed leaving a short joint 25 between adjacent slots by the returning of valve 13. The longitudinal slots 24 can be adjusted as desired by changing the shape of cam 15.

If the valve 13 is made of a pipe instead of rod the inside of the pipe may be used as a relief port.

If the device as shown in FIG. 4 having a modified top shape of valve 13 is used the slot 24' having a larger end portion b as shown in FIG. 7 can be produced by the reciprocation of the valve with a small diameter portion 13" and head a.

In the case of process using the device shown in FIG. 3 the sharp edge 13' of valve 13 allows the covering material to escape or find a way to the overflow hole 23 when the valve is closed to stop the flow of the material through the valve opening to form the longitudinal slot 24 so that the operation can be effected smoothly without causing abnormal pressure. Same may be applied to the case of FIG. 4 wherein the small diameter portion 13" is provided at the end of valve rod 13 and in this case the valve opening is entirely closed by the head portion a of the valve when the valve is advanced to form the longitudinal slot 24' as shown in FIG. 7 and if there occurs an excessive pressure subjected to the covering material to be extruded it finds a way through the relief hole 23' as shown in FIG. 4 so that the self-supporting cable as shown in FIG. 7 having window opening 24' can be manufactured smoothly.

The provision of holes b which has larger diameter than the width of the slot at each end of the slot has further advantage of minimizing the wind resistance on the cable at the joint portion 25 of the covering and also gives neat appearance to the cable.

What we claim is:

1. Cable covering apparatus comprising a source of covering material, guide means for guiding two wires in parallel, extrusion means coupled to said source and operatively disposed with respect to said guide means for receiving said wires and material, said extrusion means including a die having a dumb-bell shaped opening through which the wires and material are passed to form a covered cable having two wires interconnected by a web, and a rod slidably supported in said die for movement only in a direction normal to said wires, said rod being insertable through the dumb-bell shaped opening at substantially the center thereof to block the extrusion of the web with said wires being advanced through said die, cam means coupled to said rod for periodically operating the same to cause said rod to intermittently block extrusion of the web to form holes therein, said extrusion means being provided with overflow openings to dispose of excess material with the rod blocking the extrusion of the web.

2. Apparatus as claimed in claim 1 wherein said rod includes a bevelled end portion.

3. Apparatus as claimed in claim 1 wherein said rod includes an end portion, a main portion, and a narrowed portion connecting the first said portion.

References Cited in the file of this patent

UNITED STATES PATENTS

| | | |
|---|---|---|
| 862,475 | Haywood | Aug. 6, 1907 |
| 1,553,592 | Borner | Sept. 15, 1925 |
| 1,823,885 | Cherry | Sept. 22, 1931 |
| 2,075,038 | Hutchinson | Mar. 30, 1937 |
| 2,089,774 | Wachstein | Aug. 10, 1937 |
| 2,626,303 | Link | Jan. 20, 1953 |
| 2,628,998 | Frisbie | Feb. 17, 1953 |
| 2,834,983 | Norton | May 20, 1958 |
| 2,862,241 | De Mattia | Dec. 2, 1958 |
| 2,956,311 | Raydt et al. | Oct. 18, 1960 |
| 3,002,615 | Lemelson | Oct. 3, 1961 |

FOREIGN PATENTS

| | | |
|---|---|---|
| 477,019 | Great Britain | Mar. 11, 1936 |
| 555,228 | Great Britain | Aug. 11, 1943 |
| 747,691 | Great Britain | Apr. 11, 1956 |
| 424,995 | Italy | Sept. 5, 1947 |